UNITED STATES PATENT OFFICE.

WILHELM LANG, OF GRIESHEIM, AND CARL PISTOR AND MAX OTTO, OF BITTERFELD, GERMANY, ASSIGNORS TO CHEMISCHE FABRIK GRIESHEIM, OF FRANKFORT-ON-THE-MAIN, GERMANY.

PROCESS OF PURIFYING CAUSTIC ALKALIES.

SPECIFICATION forming part of Letters Patent No. 623,918, dated April 25, 1899.

Application filed September 2, 1898. Serial No. 690,141. (No specimens.)

*To all whom it may concern:*

Be it known that we, WILHELM LANG, a resident of Griesheim-on-the-Main, and CARL PISTOR and MAX OTTO, residents of Bitterfeld, Germany, subjects of the Emperor of Germany, have invented certain new and useful Improvements in the Purification of Caustic Alkalies, of which the following is a specification.

Although dialysis affords convenient means whereby the separation of crystalline from uncrystallizable substances can be effected, this agency has been seldom applied to the practical separation of crystalloids from one another, because the diffusion constants of crystalloids, which have been as yet determined and are in general found to be considerably greater than those of colloids, do not usually differ from one another in a ratio greater than two to one. These constants are (Winkelmann, *Handbuch der Physik*, 1891, Vol. 1, p. 638) for caustic potash, two hundred and fourteen; potassium chloride, one hundred and forty-nine; caustic soda, one hundred and sixty-two; sodium chloride, one hundred and twenty-eight.

A closer investigation of the diffusion of a mixture of caustic potash with chlorides, sulphates, sulphides, and the like revealed the unexpected fact that under certain conditions caustic potash may be almost completely separated from salts. It was found, for example, that the velocity ratio of diffusion of alkali and chloride, which in dilute solutions is about two to one, very greatly increases with increased concentration, becoming about sixteen to one in highly-concentrated solutions if care be taken to prevent the concentrations of the lye falling below a certain limit. The concentration of the pure lye obtained by diffusion in water is without influence and may be allowed to approach that of the crude lye.

The following examples serve to illustrate the foregoing:

First. By dialysis of a dilute potash lye containing 45.4 grams KOH and 0.7 grams KCl per liter, ratio 100 KOH : 1.54 KCl, a potash lye was obtained containing 12.7 grams KOH and 0.09 grams KCl per liter, ratio 100 KOH : 0.71 KCl.

Second. By dialysis of a crude colored potash lye containing iron of 50° Baumé, containing seven hundred and fifty grams KOH and twelve grams KCl per liter, ratio 100 grams KOH : 160 KCl, in which the concentration fell to 45° Baumé, a clear potash lye was obtained, free from iron, containing three hundred and sixty-five grams KOH and 0.4 grams KCl per liter, ratio 100 KOH : 0.11 KCl. While, therefore, in the comparatively dilute solution of forty-five grams per liter described in Example 1 the contents ratio dropped only from 100 : 1.54 to 100 : 0.71 in approximate agreement with the known laws of diffusion, it is shown in Example 2 that in the case of high concentrations, such as seven hundred and fifty grams per liter, the contents ratio unexpectedly drops from 100 : 1.60 to 100 : 0.11. The behavior of concentrated solutions of sodium hydroxide is similar, as is shown by the following example:

Third. By dialysis of a deep-red crude soda-lye containing silica, iron, alumina, and lime obtained by the Leblanc-soda process and having a gravity of 50° Baumé, containing seven hundred and forty-eight grams NaOH, four grams $Na_2S$, six grams NaCl, one gram $Na_2SO_4$ per liter, ratio 100 NaOH : 0.51 $Na_2S$ : 0.77 NaCl : 0.13 $Na_2SO_4$, the concentration fell to 45° Baumé and a clear soda-lye was obtained, free from silica, iron, alumina, and lime, having a gravity of 42° Baumé and the composition of five hundred and eighteen grams NaOH, 0.15 grams $Na_2S$, 0.2 grams NaCl, traces of $Na_2SO_4$ per liter, ratio 100 NaOH : 0.03 $Na_2S$ : 0.04 NaCl, 0.00 $Na_2SO_4$. By evaporation of the dialyzed lyes and subsequent dialysis the amount of other constituents may be reduced to unrecognizable traces.

The diffusion may be conducted in any desirable manner; but we have used most successfully the counter-current method, using a dialyzing-diaphragm, taking care not to have the flow of the liquids sufficiently rapid to cause the liquids to mix as well as diffuse. It must be determined by experiment what the most effective speed will be under various special circumstances. To purify large quantities of lye, the best results are obtained by employing a diaphragm; but the common parchment-paper has not proved sufficiently durable for this purpose. The lyes appear to cause no chemical reaction with the paper, but cause it to shrink, and hence be torn apart. We have prepared a diaphragm which is especially adapted for dialyzing lyes, and which we have found to remain in good condition for at least two hundred hours. This diaphragm consists of parchment-paper, with which is incorporated a parchmentized fabric. By this means the tendency of the parchment to shrink under the action of the lyes is obviated to a great extent, and the process may proceed with but infrequent interruptions for the substitution of fresh diaphragms.

Since the dialysis of caustic alkalies by means of membranes, such as parchment, proceeds with extraordinary rapidity and the evaporation of the water added during the process costs but little, the process according to this invention affords a new and practical process of far-reaching technical application for the preparation on a large scale and in a simple manner of caustic alkalies in a state of great purity, a result which has hitherto been only obtained by crystallization from alcohol, which has considerably increased the cost of the product.

We claim—

1. The process of purifying caustic lyes, which consists in increasing the diffusiveness of a solution of the lyes which is mixed with other solutions of a similar diffusiveness, by increasing the degree of concentration of said lyes, and then separating the lyes from the mixture by diffusion into water, substantially as described.

2. The process of purifying caustic lyes, which consists in increasing the diffusiveness of a solution of the lyes which is mixed with other solutions of a similar diffusiveness, by increasing the degree of concentration of said lyes, then separating the lyes from the mixture by diffusion into water, and maintaining the higher degree of concentration of the lyes in the mixture, substantially as described.

3. The process of purifying caustic lyes, which consists in increasing the diffusiveness of a solution of the lyes which is mixed with other solutions of a similar diffusiveness, by increasing the degree of concentration of said lyes, and separating the lyes from the mixture by diffusion into water through a suitable diaphragm, substantially as described.

In testimony whereof we have signed our names to this specification in the presence of two subscribing witnesses.

WILHELM LANG.
CARL PISTOR.
MAX OTTO.

Witnesses for Wilhelm Lang:
   TOS LORENZ,
   WILHELM POSTH.
Witnesses for Carl Pistor and Max Otto:
   RUDOLPH FRICKE,
   MICHAEL VOLTS.